US007106902B2

(12) United States Patent
Nakazawa et al.

(10) Patent No.: US 7,106,902 B2
(45) Date of Patent: Sep. 12, 2006

(54) PERSONAL AUTHENTICATION SYSTEM AND METHOD THEREOF

(75) Inventors: Tsutomu Nakazawa, Isesaki (JP); Kouichi Hamakawa, Nitta-Gun (JP); Youji Takei, Kounosu (JP); Masanobu Kiyama, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 726 days.

(21) Appl. No.: 10/305,395

(22) Filed: Nov. 27, 2002

(65) Prior Publication Data

US 2003/0123710 A1 Jul. 3, 2003

(30) Foreign Application Priority Data

Nov. 30, 2001 (JP) ............................ 2001-366801

(51) Int. Cl.
*G06K 9/18* (2006.01)
*G06K 9/38* (2006.01)
*G06K 9/40* (2006.01)

(52) U.S. Cl. ...................... 382/182; 382/272; 382/274; 382/275

(58) Field of Classification Search ................ 382/182, 382/183, 274, 275, 116; 235/462.06, 494
See application file for complete search history.

(56) References Cited

U.S. PATENT DOCUMENTS

| | | | | |
|---|---|---|---|---|
| 5,510,607 | A | 4/1996 | Ishikawa | |
| 5,550,359 | A * | 8/1996 | Bennett | 235/382 |
| 6,003,773 | A | 12/1999 | Durbin et al. | |
| RE36,580 | E * | 2/2000 | Bogosian, Jr. | 382/116 |
| 6,036,095 | A | 3/2000 | Seo | |
| 6,332,574 | B1 | 12/2001 | Shigekusa et al. | |
| 6,580,808 | B1 | 6/2003 | Rhoads | |
| 6,606,421 | B1 | 8/2003 | Shaked et al. | |
| 6,612,497 | B1 * | 9/2003 | Iida et al. | 235/462.25 |
| 6,687,414 | B1 * | 2/2004 | Edgar | 382/275 |
| 6,749,120 | B1 | 6/2004 | Hung et al. | |
| 6,758,399 | B1 | 7/2004 | Brunelli et al. | |
| 6,866,199 | B1 | 3/2005 | Keech et al. | |

FOREIGN PATENT DOCUMENTS

| | | |
|---|---|---|
| CN | 1173234 A | 2/1998 |

OTHER PUBLICATIONS

Office Action mailed Aug. 24, 2005, directed to related U.S. Appl. No. 10/305,396.

Office Action mailed Jan. 11, 2005, directed to related U.S. Appl. No. 10/305,396.

(Continued)

*Primary Examiner*—Joseph Mancuso
*Assistant Examiner*—Robert Tarcu
(74) *Attorney, Agent, or Firm*—Morrison & Foerster LLP

(57) ABSTRACT

A personal authentication system of this invention has a card reader, in which a bar code reading device for reading a two-dimensional barcode containing personal data, a CMOS image sensor for producing face data by photographing the face of a person, and a fingerprint reading device for producing fingerprint data by reading the fingerprint of the person are assembled as one unit. A personal computer performs a projection transform and a brightness correction to the barcode read by the card reader for acquiring accurate data. Then, the personal data, the face data, and the fingerprint data are compared with database for authenticating the person. Therefore, this invention achieves more accurate personal authentication and leads to improved security.

2 Claims, 7 Drawing Sheets

OTHER PUBLICATIONS

Office Action mailed Jun. 25, 2004, directed to related U.S. Appl. No. 10/305,396.

Office Action mailed Nov. 17, 2003, directed to related U.S. Appl. No. 10/305,396.

* cited by examiner ( A ) The photographed image of the two-dimensional bar code.

( B ) The photographed image of the grids.

( C ) The grids corrected through the projection transform.

( D ) The image of the two-dimensional bar code corrected through the projection transform.

( A ) The image of the two-dimensional bar code with a uniform brightness.

( B ) The photographed image of the two-dimensional bar code.

( C ) The image of the two-dimensional bar code through the divalent process.

( D ) The image of the two-dimensional bar code divided into a plurality of blocks.

PERSONAL AUTHENTICATION SYSTEM AND METHOD THEREOF

BACKGROUND OF THE INVENTION

1. Field of the Invention

This invention relates to a personal authentication system and its method for providing improved securities, especially to a system and a method for personal authentication based on multiple-information from a bar code reading device, a digital camera and a finger print sensor.

2. Description of the Related Art

A bar code reading device, a finger print sensor, and a face recognition camera have been known as security devices used at various facilities.

A card with the bar code data including one's address, name, and the name of the company and the department this person is working for, is given to the person. When the person tries to enter the facility, the facility performs a verification of this person by using a bar code reading device as one of the personal authentication methods.

An individual fingerprint is stored in a database for one of the personal authentication methods by using a fingerprint sensor. When a person enters the facility, the fingerprint data read by the fingerprint sensor is compared to the fingerprint in the database for the personal authentication.

Also, an individual facial photograph is stored in a database for one of the personal authentication methods with a face recognition camera. When a person enters the facility, the face data read by the face recognition camera is compared to the face data in the database for the personal authentication.

However, since the bar code reading device, the fingerprint sensor, and the face recognition camera are used independently, the accuracy of the personal authentication is limited. For example, when the bar code reading device is used alone, it is not possible to know if the person with the bar code card is the authentic person. Also, the fingerprint sensor or the face recognition camera alone cannot provide the other personal data.

An Intacta code that can store a vast amount of information has been known as one of two-dimensional bar code systems. However, since a scanner performs the reading of the Intacta code, a large size reading device and a relatively long reading time are required.

This invention is, therefore, directed to size reduction of the reading device and to the improvement of the reading speed, by using an area sensor for reading the Intacta code.

However, when the focal distance of the lens mounted on the area sensor is short for the size reduction of the reading device, the projected image of the Intacta code has distortion and bright spots (brightness imbalance), preventing the accurate reproduction of the recorded information.

SUMMARY OF THE INVENTION

This invention is directed to an accurate personal authentication system based on multiple-information provided by a system, in which a bar code reading device, a fingerprint sensor and a face recognition camera are unified as one unit.

The following three steps will be performed on an image of a two-dimensional bar code obtained by photographically capturing the two-dimensional bar code containing a personal data by an area sensor:

1) a step for correcting distortion by a projection transform;
2) a step for correcting bright spots (brightness imbalance) appearing on the image;
3) a step for decoding the two-dimensional bar code based on the image data of the two-dimensional bar code corrected by the previous two steps.

Since the area sensor is used for reading of the two-dimensional bar code in this invention, the reading speed is dramatically improved, compared to that of the line sensor.

Also, the software processing steps 1 and 2 are employed for correcting the distortion and the bright spots, which appear on the two-dimensional bar code image photographed by the area sensor. Therefore, the compact area sensor with a short focal distance and a low price can be achieved, leading to the size reduction of the reading device.

DESCRIPTION OF THE INVENTION

Figure 1:
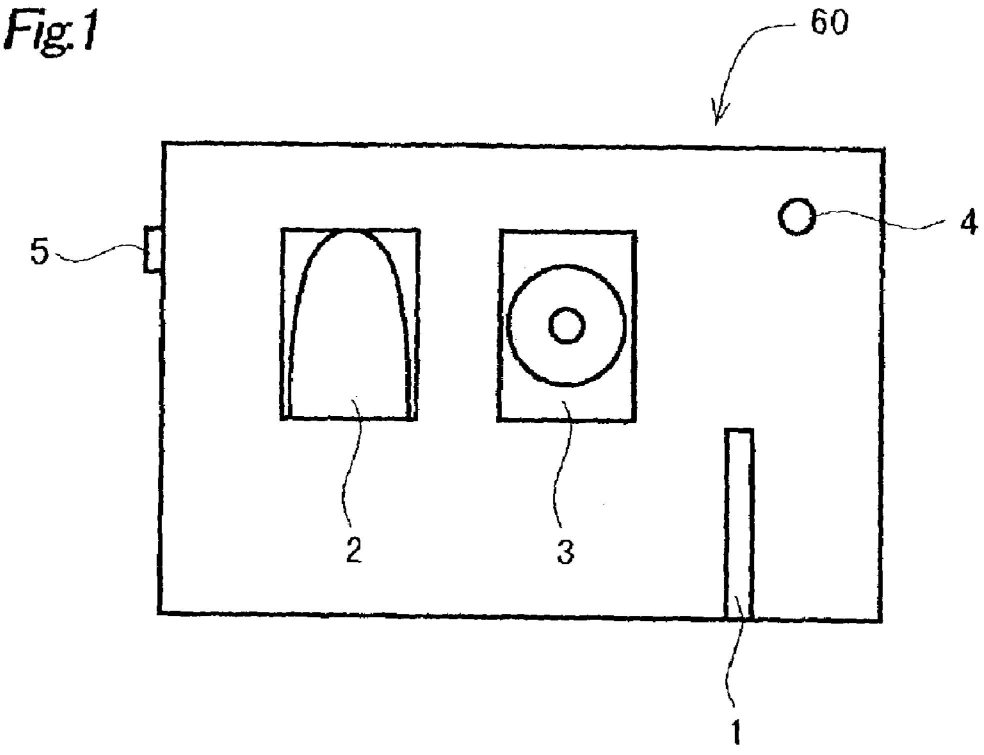
FIG. 1 is a plan view of a card reader of an embodiment of this invention.
Figure 2:
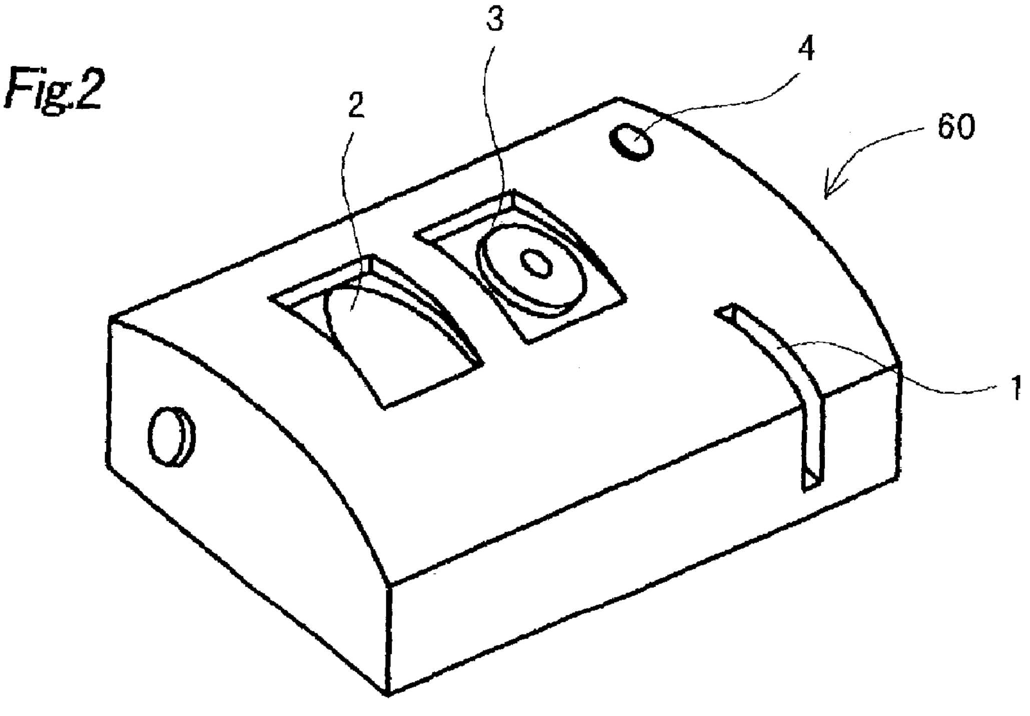
FIG. 2 is a perspective view of the card reader of the embodiment of FIG. 1.

The embodiment of this invention will be explained by referring to figures. FIG. 1 is a plan view and FIG. 2 is a perspective view of a card reader 60 of an embodiment of this invention. The card reader 60 comprises a bar code reading device for reading a two-dimensional bar code, a digital camera that produces face data by photographing person's face, and a fingerprint reading device that produces fingerprint data by reading person's fingerprint, all in a square container with a predetermined shape.

In FIGS. 1 and 2, the reference numeral 1 indicates a slot, to which a card (for example, a card with the size of a business card) with the two-dimensional bar code (for example, Intacta code) printed is inserted for code reading. The reference numeral 2 indicates a fingerprint sensor located at the left side of the upper surface, the reference numeral 3 a lens of a face recognition digital camera disposed at the right side of the fingerprint sensor 2, and the reference numeral 4 an LED located at the upper right corner that shows the result of the authentication, respectively.

Figure 3:
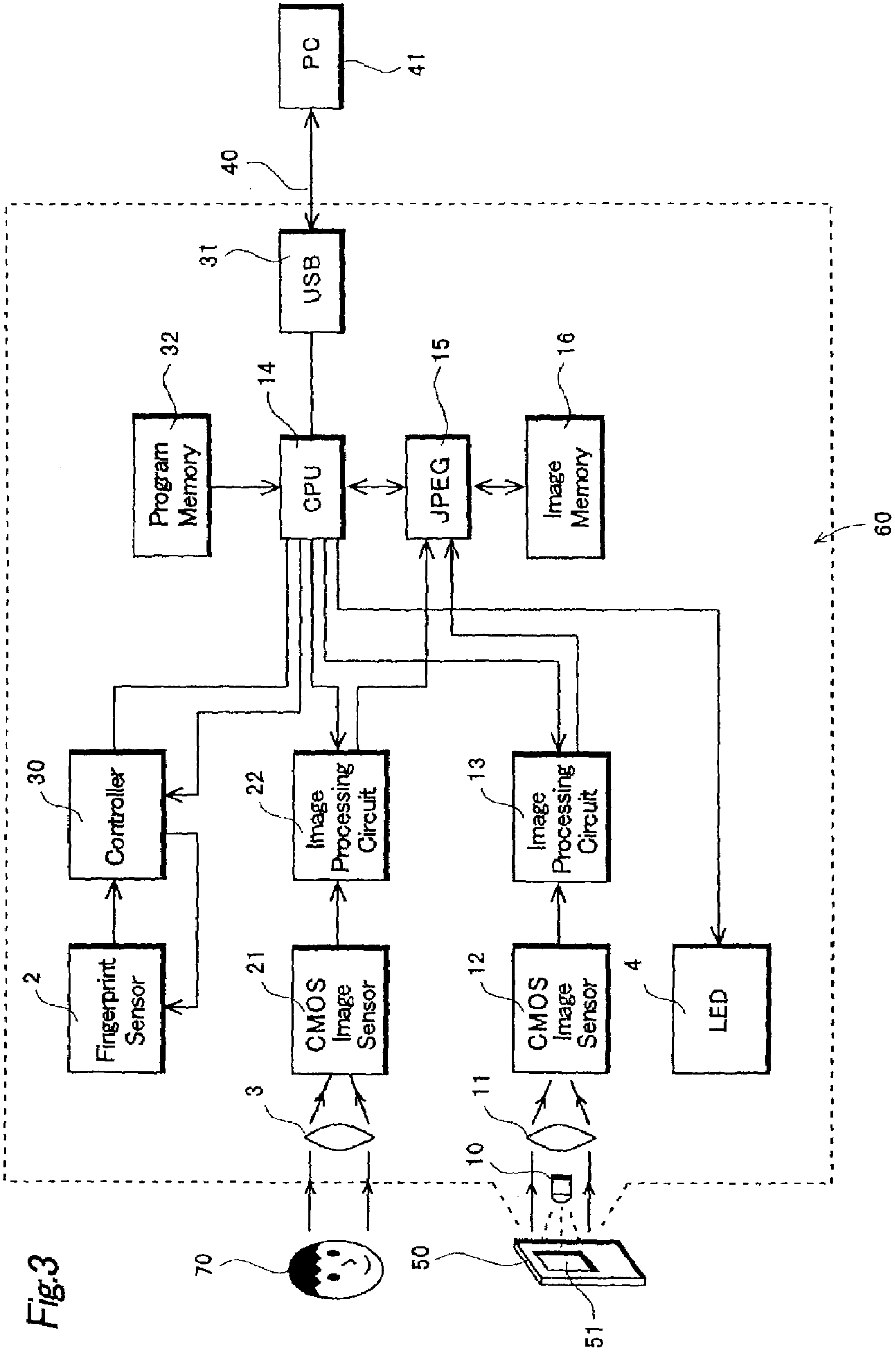
FIG. 3 is a block chart of a personal authentication system of the embodiment of this invention.

FIG. 3 is a block chart showing a personal authentication system of the embodiment of this invention. In this figure, the components surrounded by the broken line constitute the card reader 60.

First, the configuration of the bar code reading device will be explained. When the card 50 (for example, a card with the size of a business card) with the two-dimensional bar code (for example, Intacta code) printed is inserted into the slot 1 of the card reader 60, an LED 10 that is disposed close to a code area 51 with the Intacta code printed turns on, shedding the light to the code area 51. Then, the image of the two-dimensional bar code coming through a short focal distance lens 11 is converted into an electric signal by a CMOS image sensor 12 such as a CCD.

The output signal from the CMOS image sensor 12 is converted into digital data using a predetermined form by an image processing circuit 13. The image data from the image processing circuit 13 is compressed by a JPEG unit 15 and an image memory 16 based on the instruction from a CPU 14. The CPU 14 is operated according to a program stored in a program memory 32 (flash memory).

Next, the configuration of the face recognition digital camera will be explained. An image of a person's face 70 that comes through a long focal distance lens 3 is converted into the electric signal by a CMOS image sensor 21 such as CCD. The output signal from the CMOS image sensor 21 is converted into digital data using a predetermined form by an image processing circuit 22. Then, the image data from the image processing circuit 22 is compressed by the JPEG unit 15 and the image memory 16 based on the instruction from the CPU 14.

Next, the configuration of the fingerprint reading device will be explained. The fingerprint sensor 2 provides signals corresponding dark and bright areas based on a static capacitance that changes according to the distance between the finger surface and the sensor, and converts it into fingerprint image data. The reference numeral 30 indicates a controller for controlling the sensitivity of the sensor 2 based on the instruction from the CPU 14.

The image data of the two-dimensional bar code from the bar code reading device, the face image data from the face recognition digital camera, and the fingerprint image data from the fingerprint reading device are sent to a personal computer 41 through an USB cable 40 after converted into serial data based on an USB protocol by an USB interface 31. The personal computer 41 performs a variety of correction procedures later on the image data of the two-dimensional bar code.

Figure 4:
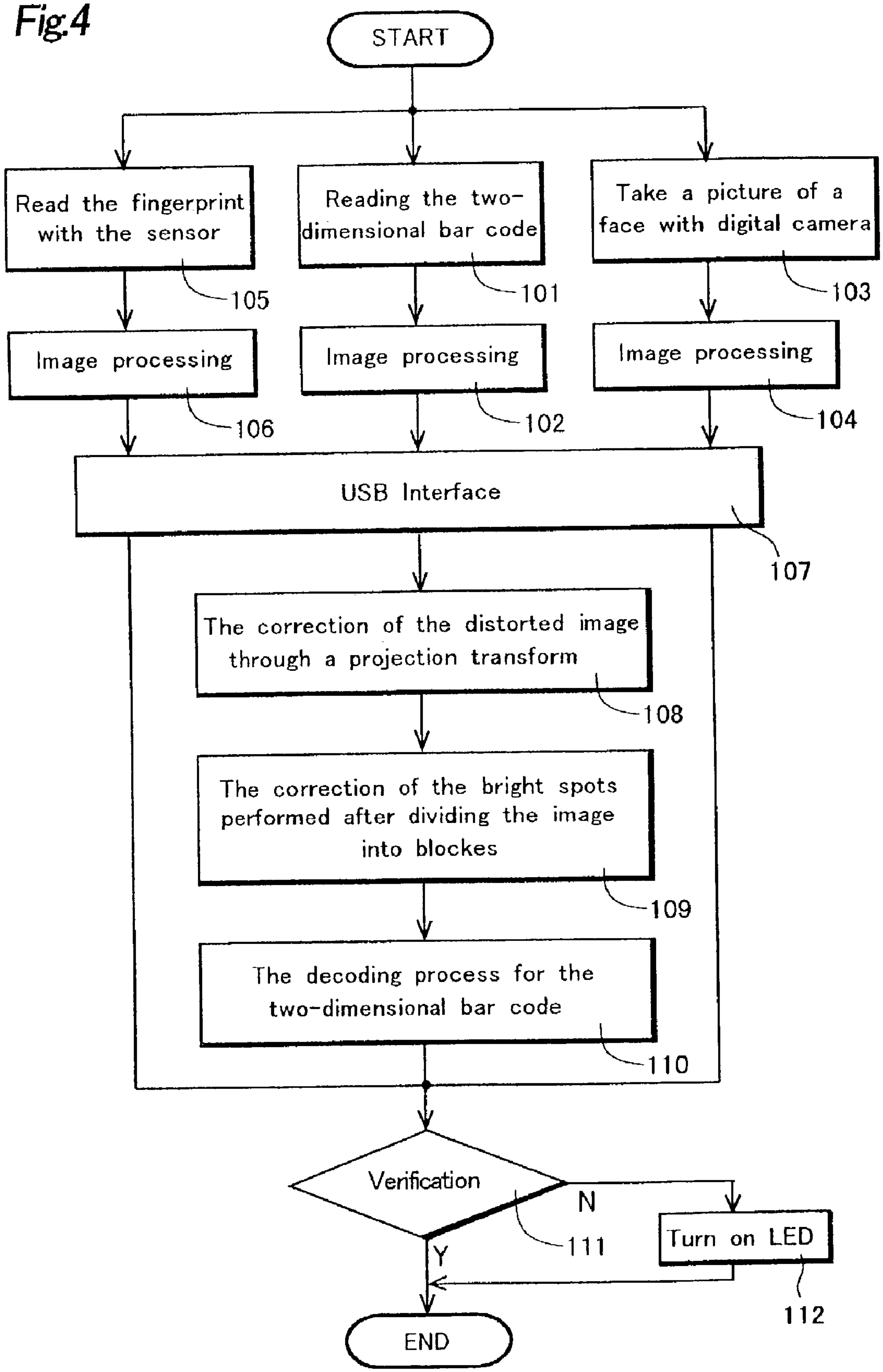
FIG. 4 is a flow chart of a personal authentication method of the embodiment of this invention.

FIG. 4 is a flow chart for explaining the personal authentication method of the embodiment of this invention.

The reading of the two-dimensional bar code using a device with an area sensor is performed at a step 101. The face image data including the characteristics of one's face and the fingerprint image data including the characteristics of one's fingerprint, in addition to the personal data such as the name, address, name of the company and department of the person, are encoded in the two-dimensional bar code.

The area sensor includes the above mentioned LED 10, the short focal distance lens 11, and the image sensor 12 such as CCD and CMOS. The image processing including the compression of the image data of the two-dimensional bar code is performed at a step 102.

The face recognition digital camera photographically captures a person's face at a step 103, and the image processing is performed at a step 104.

The fingerprint reading device 2 reads the fingerprint at a step 105, and the fingerprint image data is produced through the image processing at a step 106. The order of executing the steps 101, 103, and 105 is arbitrary.

The two-dimensional bar code image data, the face image data, and the fingerprint image data are converted into serial data through the USB interface and sent to the personal computer 41 at a step 107. A software processing of the personal computer 41 carries out the tasks flowing the step 107.

The correction of the distorted image through a projection transform is performed to the two-dimensional bar code image data taken into the personal computer 41 at a step 108. This step is for correcting the distortion in the image captured by the area sensor with the short focal distance lens 11.

Then, the correction of the brightness imbalance is performed at a next step 109. This step of correcting the brightness imbalance is necessary because the LED 10 can not illuminate uniformly the area 51 of the Intacta code, which results in a variation in the brightness in the image. In this step, the correction is made in each block after dividing the image into a plurality of blocks. The order of performing the correcting steps 108, 109 can be reversed.

Then, the corrected image data is decoded at a step 110. For example, the Intacta code is decoded through the reproduction program of the Intacta code, decoding the two-dimensional bar code (for example, the Intacta code) and reproducing the recorded information such as letters and images.

The data is verified at a next step 111. For example, the personal data, the face image data, and the fingerprint image data from the reproduced two-dimensional bar code are compared to the data that have been already registered for authenticating the person. Or the face image data and the fingerprint image data from the reproduced two-dimensional bar code are compared to the face image data from the digital camera and the fingerprint image data from the fingerprint reading device, respectively, in order to verify that the cardholder is the authentic person.

When the cardholder is not authenticated as a result of the comparison, the message is sent to the card reader 60 from the personal computer 41 through the UBS cable 40. The LED 4 of the card reader 60 turns on, informing the fact that the personal authentication is failed (a step 112).

Next, the distortion correction procedure through the projection transform at the step 108 and the bright spots correction procedure after dividing the image into a plurality of blocks at the step 109 will be explained in detail by referring to FIGS. 5–9.

Figure 5:
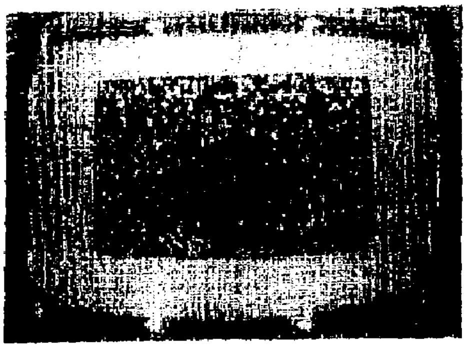
FIG. 5 shows a correcting procedure of a distortion of a bar code image through a projection transform.
Figure 5:
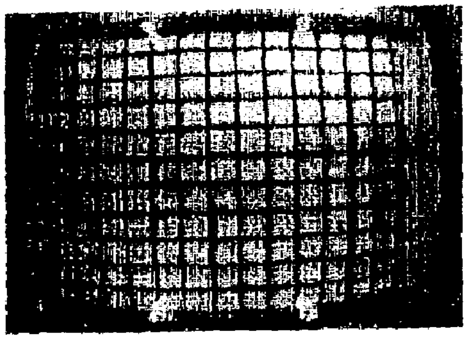
Figure 5:
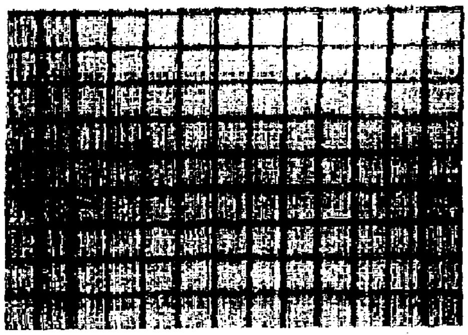
Figure 5:
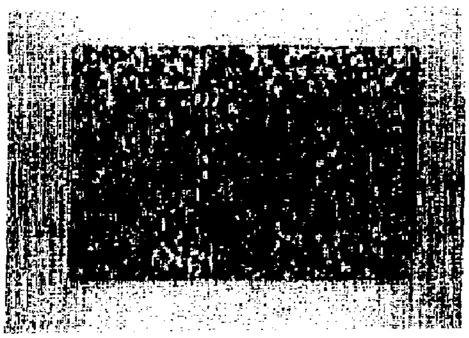
Figure 6:
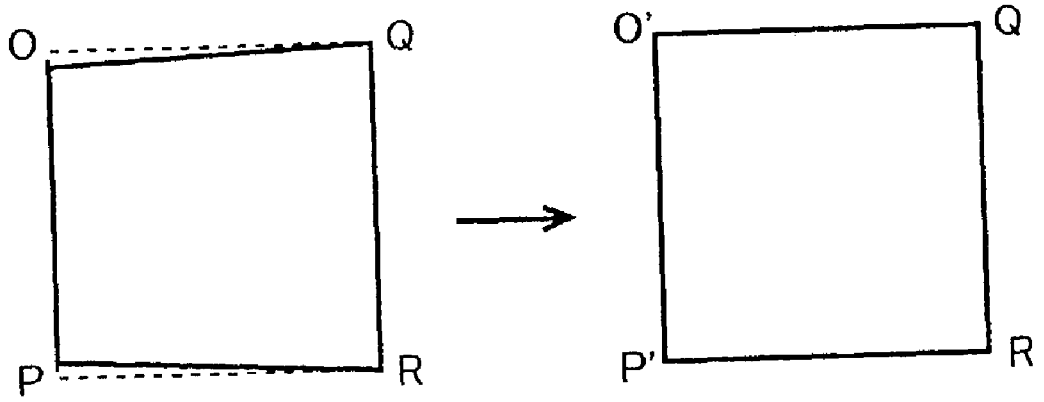
FIG. 6 shows the correcting procedure of FIG. 5 for a square of the distorted image.

FIGS. 5 and 6 show a correction scheme of the distorted image by the projection transform. The projection transform is a method of processing an image for shrinking or enlarging a part of the image. The projection transform can be obtained by, first determining the four points of the square to be transformed, and then deciding the coordinates, to which each of the points should be moved after the transform.

FIG. 5(A) shows the image of the two-dimensional bar code photographed by the reading device. The Intacta code is the two-dimensional bar code developed by the Intacta Loves Limited of the United States. The Intacta code comprises black and white two-dimensional dot patterns. It is able to store high-density information, compared to a one-dimensional bar code. Therefore, it is possible to store the multi-media information including musical data, image data, and text image data by coding them and utilizing a piece of paper with the Intacta code printed as an information-recording medium. The quantity of the information the Intacta code can store depends on the density of the dot patterns. The finer the dots (also called pixel elements) are, the more information can be stored.

The lens 11 with the short focal distance is used for the size-reduction of the reading device. The close-up photographing distance (the distance between the lens 2 and the two-dimensional bar code printed on the piece of paper 50) of the camera is very short. It is seen that the peripheral area of the photographed two-dimensional bar code is somewhat rounded. Therefore, it is impossible to decode the bar code under this condition because of the distortion in the image. The shorter the close-up photographing distance of the camera is, the greater the distortion in the image is.

In order to correct the distortion, the image shown in FIG. 5(B) is obtained by photographing the grids printed on a similar piece of paper 50 by the reading device. The distortion of the grids is recognized in this image. The coordinates of the four corner points O, P, Q, R of one of the distorted squares of the distorted grids are obtained (FIG. 6).

The distorted square obtained from the procedure described above is then transformed to an accurate square by the projection transform. For example, as schematically seen from FIG. 4, the points O, P, Q, R before the transformation are moved to the points O', P', Q, R for obtaining the accurate square through the projection transform. As it is seen from the FIG. 5(C), the distorted squares are now corrected. The data for moving the pixel elements in each of the distorted squares to the correct locations can be acquired from the above mentioned processes. Then, the projection transform matrix is obtained and stored as the correction data.

The projection transform is then performed to the photographed image of the two-dimensional bar code (FIG. 5(A)) by using the correction data. The corrected image shown in FIG. 5(D) is, then, acquired. It can be seen from this image that the rounded peripheral area of the image has been corrected. The reproduction of the two-dimensional bar code based on the corrected image now becomes possible.

Figure 7:
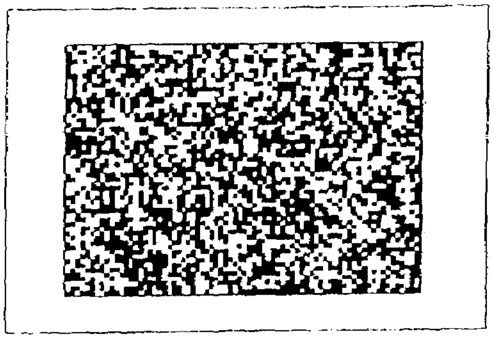
FIG. 7 shows a correcting procedure of brightness imbalance of the bar code image.
Figure 7:
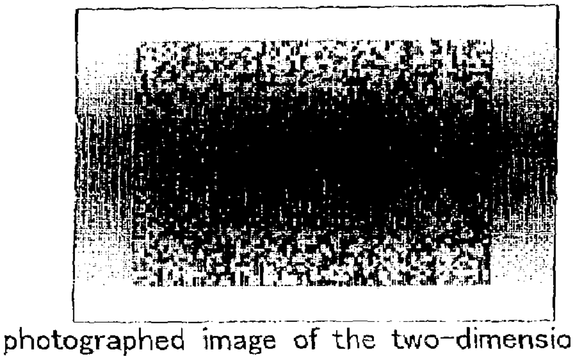
Figure 7:
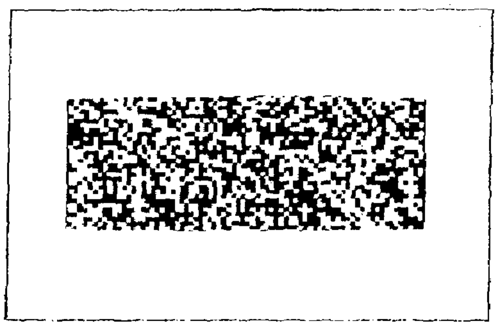
Figure 7:
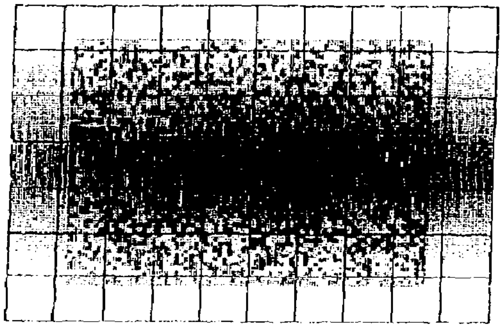
Figure 8:
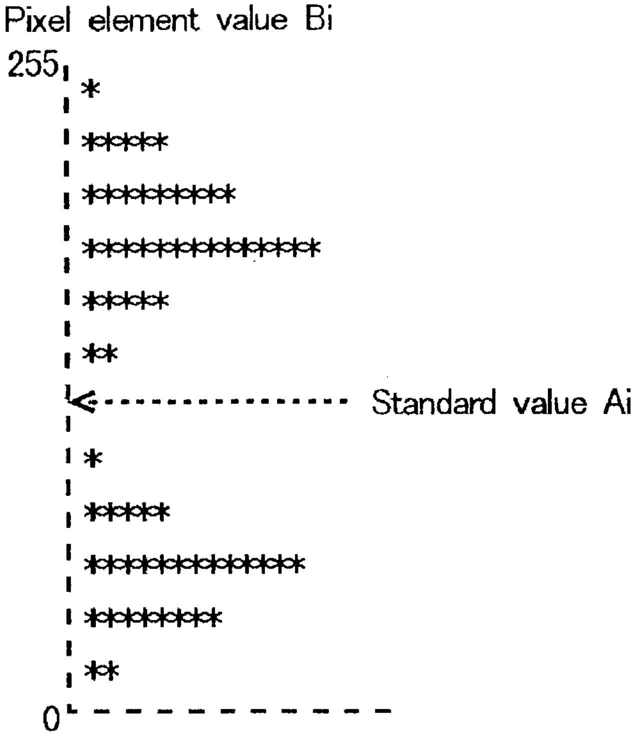
FIG. 8 shows a brightness distribution among pixel elements of a divided block of the bar code image.
Figure 9:
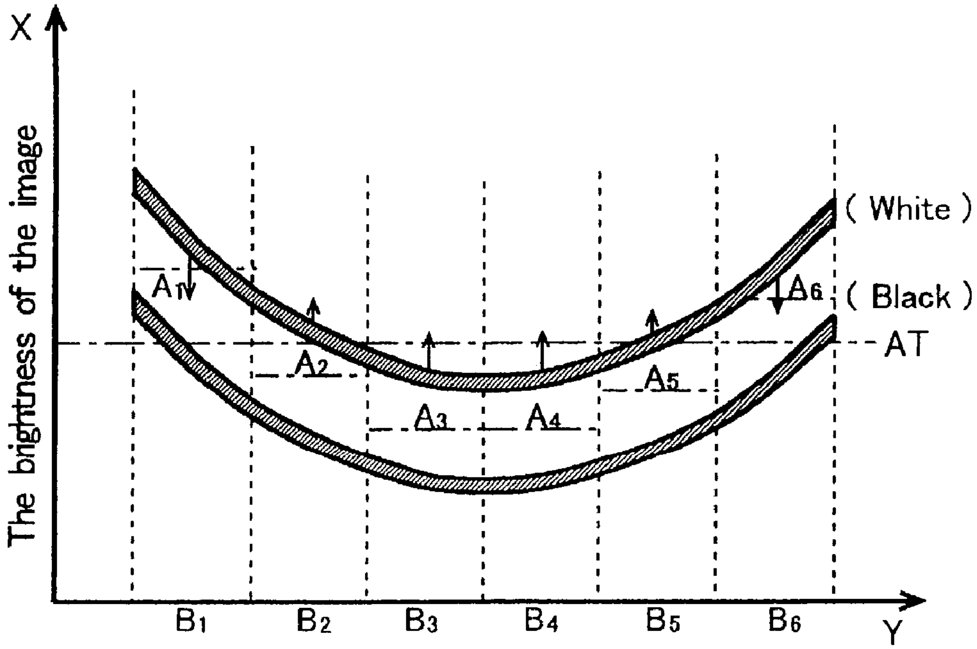
FIG. 9 shows the relationship between block standard values of the brightness and the standard value of the brightness of the whole bar code image.

Next, the bright spots correction in each divided block at the step 109 will be explained by referring to FIGS. 7–9. It is ideal to obtain the image with a uniform brightness such as the one shown in FIG. 7(A), when the reading device with the area sensor captures a photographic image of the two-dimensional bar code.

However, in practice, the image that has a variation in brightness, such as the one shown in FIG. 7(B), is obtained depending on the location of the LED 10 mounted on the reading device and other factors. In the example of the image shown in FIG. 7(B), two LED light sources are located near the upper and lower sides of the card 50, making the upper and lower sides brighter than the middle of the image.

Therefore, it is not possible to accurately reproduce the two-dimensional bar code. The image processing is performed to the image with the varied brightness in order to acquire a proper image. The area with a brightness lower than a standard value (threshold value) is converted into black area and the area with a brightness higher than the predetermined value is converted into white area through this processing (referred to as a divalent processing, hereinafter), obtaining the image shown in FIG. 7(C).

Here, in the figure, the upper and lower parts of the image of the two-dimensional bar code do not appear. This is because the 'black' pixel elements in the brighter area located upper and lower parts of the image is brighter than the 'white' pixel elements in the darker area located in the middle. Thus, the 'black' pixel elements in the brighter area located upper and lower parts of the image are transformed into 'white' when the brightness correction is performed based on a single standard value.

The following process is performed to solve the problem mentioned above.

The image data of the two-dimensional bar code photographed by the reading device is divided into a plurality of blocks Bi with a matrix configuration as shown in FIG. 7(D). The brightness correction is performed based on the standard value for each of the blocks Bi. That is, as seen from the FIG. 8, the distribution of the brightness (pixel element value) of the pixel elements (dots) is obtained for each of the blocks Bi.

The pixel element value is the value of the brightness expressed in numbers and it ranges from 0 to 255. The pixel element value 0 represents the darkest and the pixel element value 255 represents the brightest value. There are black pixel elements and white pixel elements in the image, thus the distribution of the pixel elements will be divided into two concentrations of white and black. The pixel element value between the two concentrated areas is selected as a standard value Ai. Therefore, each of the standard values Ai has the value reflecting the brightness of each of the blocks Bi. When the distribution of black and white does not show the distinctive two concentrated areas, the value approximately in the middle of the distribution of black and white is chosen as the standard value Ai.

The distribution of the brightness (pixel element value) in the whole image is also obtained. A standard value AT in the whole image is obtained from the distribution of the brightness in the whole image through the same procedure. FIG. 9 schematically shows the brightness correction. The Y-axis shows one of the coordinates of the image. For example, the Y-axis may be the vertical axis of the paper shown in FIG. 7(D).

The area shown as the Y-axis is divided into six blocks B1–B6. The X-axis shows the brightness of the image (pixel element). The standard values of the blocks B1, B2, B3, B4, B5, B6 are A1, A2, A3, A4, A5, A6, respectively. The standard value for the whole image is shown as AT.

The brightness of each block is then corrected based on the standard value Ai of this particular block and the standard value AT of the whole image. For example, since A1>AT in the block B1, the distribution of black and white is shifted toward the darker side based on Δ A1, the difference between A1 and AT. In the block B3, on the other hand, A3<AT, thus, the distribution of black and white is shifted toward the brighter side based on Δ A3, the difference between A3 and AT.

In this manner, the brightness correction is performed for each block. The divalent data of the two-dimensional bar code is obtained by performing the divalent processing to the corrected image.

The Intacta code is used as an example of the two-dimensional bar code in this embodiment. However, this invention is not limited to this code. This invention is broadly applicable to the reading method of the two-dimensional bar code.

Although the steps 108–111 in FIG. 4 are done by the software processing of the personal computer 41 in this embodiment, the processing dose not have to be done inside the personal computer 41. That is, it is also possible for the CPU 14, which is built in the card reader 60 in FIG. 3, to perform the tasks of steps 108–111, since the processing ability of the CPU has been dramatically improved in recent years. In this case, the procedures from the reading of the two-dimensional bar code, the taking of the face image data and the fingerprint image data to the verification of these data can be performed inside the card reader 60 without connecting it to an outside device. Therefore, the card reader alone can achieve the task of the personal authentication if there is no outside device such as the personal computer.

Additionally, the personal authentication can be performed by using the fingerprint data and the face data based on the information carried in the two-dimensional bar code of the card in this embodiment. Also, the personal computer 41 and the card reader 60 can be connected to an outside database through the communication network such as telephone line, a communication line and the Internet. Then, the more detailed information and specific information can be read out from the outside database by accessing the outside database based on the personal data carried in the card. It is also possible for the personal computer 41 or the card reader 60, which has received the detailed information or the specific information, to make a special display in a display device. The criminal record is an example of the detailed information or the specific information. If the personal computer 41 or the card reader 60 identifies such data with the information from the outside database, it can make a special display in a built-in display device. Two image sensors, one for the two-dimensional bar code and one for the face recognition, are used in this embodiment as shown in FIG. 3. However, it is also possible to install one image sensor that can perform both the two-dimensional bar code reading and the face recognition by switching between the short focal distance lens and the long focal distance lens.

According to the personal authentication system of this invention, the personal authentication is performed based on the multiple-information provided by the system, in which the bar code reading device, the fingerprint sensor and the face recognition camera are assembled as one unit, leading to more reliable personal authentication In this invention, the image distortion due to the short focal distance of the lens and the varied brightness due to the short distance irradiation of the light for the two-dimensional bar code are corrected before decoding the two-dimensional bar code through the reproduction program. Therefore, the size reduction of the reading device can be achieved. Also, the reading speed is improved compared to the reading by a line scanner.

What is claimed is:

1. A method of authenticating a subject, comprising:

reading a two-dimensional bar code of the subject that contains personal data of the subject, the reading comprising correcting a distortion of an image of the two-dimensional bar code obtained from an area sensor by a projection transform, correcting brightness imbalance of the bar code image, and decoding the two-dimensional bar code based on image data of the two-dimensional bar code after the distortion correction and the brightness correction;

capturing a facial image of the subject to provide facial data of the subject;

reading a finger print of the subject to provide finger print data of the subject; and performing an authentication of the subject based on the personal data, the facial data and the finger print data, wherein the brightness correction comprises dividing the image of the two-dimensional bar code into a plurality of blocks, and correcting the brightness imbalance for each of the blocks, and the brightness correction for each of the blocks comprises determining a block standard value based on a brightness distribution among pixel elements in said each of the blocks, and determining a standard value for the whole image based on a brightness distribution of the whole image, the brightness correction for each of the blocks being performed based on the block standard values and the standard value of the whole image.

2. The method of authenticating a subject of claim 1, wherein the distortion correction of the bar code image by the projection transform comprises acquiring correction data for correcting the distortion of the bar code image based on coordinates of four corner points of a square photographically captured by the area sensor, and correcting the distortion of the bar code image by the projection transform based on the correction data.

* * * * *